Patented Mar. 26, 1940

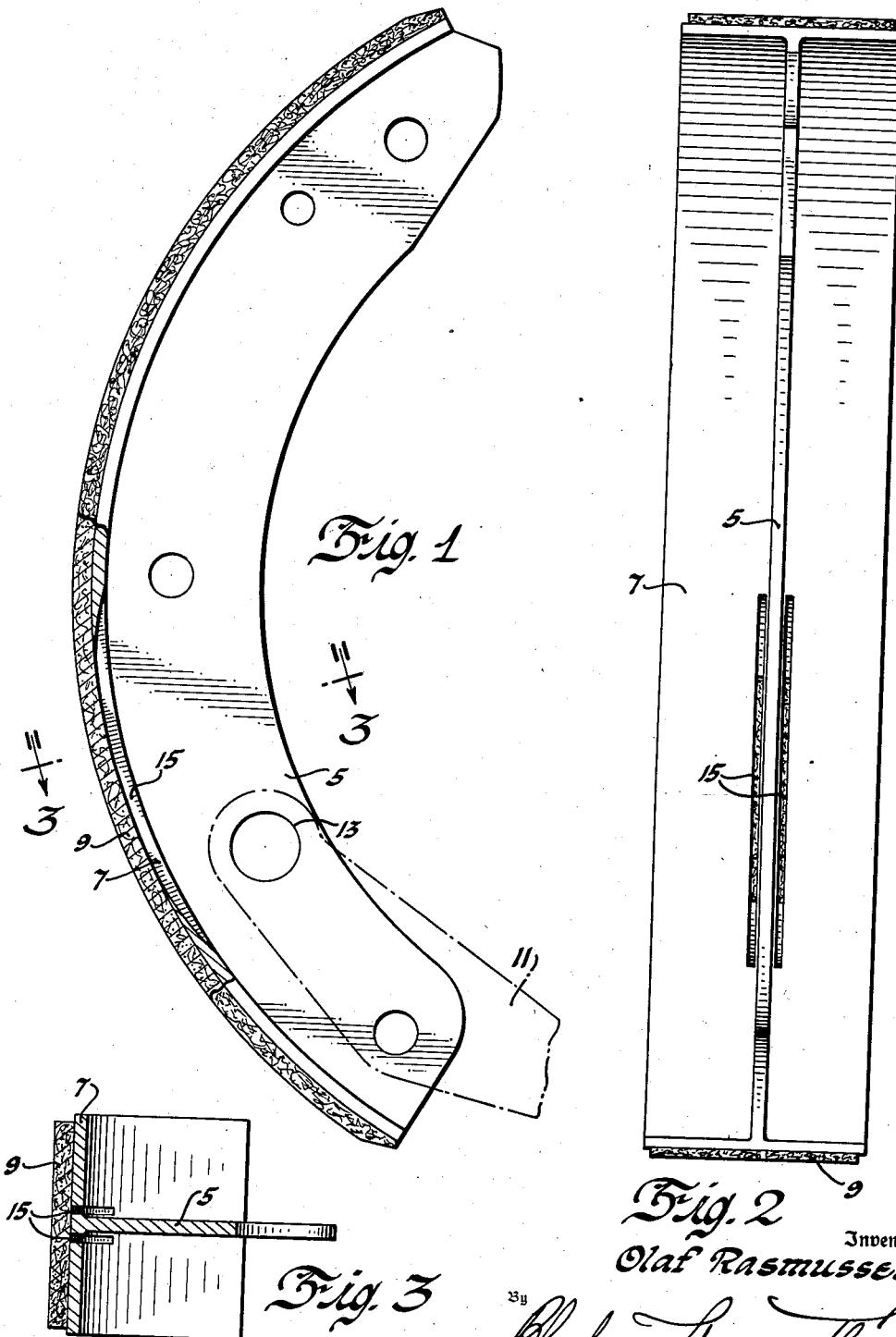

2,195,262

UNITED STATES PATENT OFFICE 2,195,262

BRAKE SHOE

Olaf Rasmussen, Dayton, Ohio, assignor to General Motors Corporation, Detroit, Mich., a corporation of Delaware Application October 18, 1939, Serial No. 299,917

2 Claims. (Cl. 188—250)

This invention relates to brakes and more particularly to brake shoes for frictionally engaging drums carried by vehicle wheels.

An object of the invention is to modify the conventional form of brake shoe in a way to prevent the squeaks which are sometimes produced in use.

The invention is illustrated in the accompanying drawing in which:

Figure 1 is a view in elevation, partly broken away and in section of the improved shoe.

Figure 2 is a view of the shoe as seen from the right side of Figure 1.

Figure 3 is a section on line 3—3 of Figure 1.

On the drawing the brake shoe is shown as of T section having a web 5 and a flange 7, the latter having a friction facing 9. The web and flange may be integral as illustrated or may be separately formed and secured together by welding or otherwise.

The shoe should be considered as one of two similar shoes to be spread apart into engagement with drum, not shown. The spreading means is not a part of the invention. It may be a cam or an hydraulic motor operating between and upon one pair of adjacent shoe ends. The shoes may be anchored at the opposite pair of adjacent ends on a fixed abutment, not shown, there being provided an articulating link 11 pivoted to the shoe at 13 and through which the thrust and reaction is transmitted.

It has been found that such shoes sometimes produce a squeak when spread into contact with the rotating drum. To avoid the squeak, slots 15, in accordance with this invention, are cut in the flange, one on each side of the web and adjacent the point of pivotal connection between the web and link 11. There results some degree of flexibility in the parts of the flange in the region of the slots. It will be observed that the rigidity of the shoe as a whole is not sacrificed by providing this flexibility of the two parts of the flange. This will be appreciated if it be noted that the linear engaging contact between the flange and web is continuous throughout the arc of the shoe even in the region of the slots.

It has been found that the flexibility so produced results in a non-uniform wear of the friction material and that it serves to prevent the squeaks. It does so with no lessening of the pressure transmitted between the flange and web even in the region adjacent the slots.

I claim:

1. An arcuate brake shoe comprising a web and a flange arranged in right angular relation, there being continuous contact between the web and flange throughout the length of the shoe arc, said flange having slots one on each side of the web, in parallel relation with each other and with said web.

2. The invention defined by claim 1, said shoe having an articulating link pivoted thereto and said slots being located adjacent the pivotal connection of the shoe and link.

OLAF RASMUSSEN.